Aug. 9, 1938.   P. H. WESTERLUND   2,126,072
ENSILAGE HARVESTER
Filed April 23, 1936   2 Sheets-Sheet 1
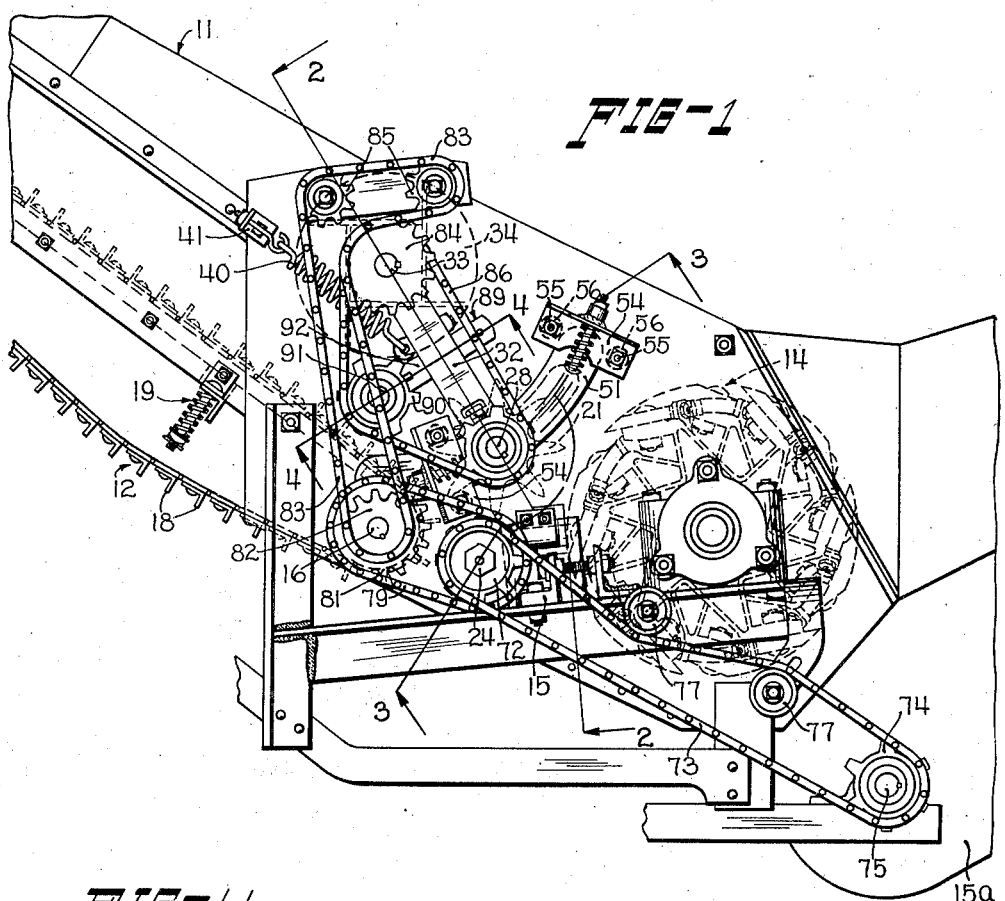
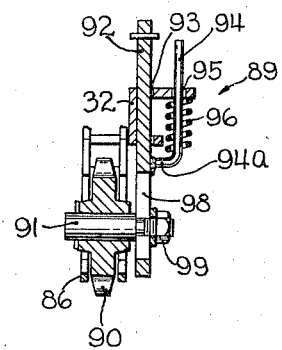
INVENTOR
Paul H. Westerlund,
BY
Brown, Jackson, Boettcher &drewer,
ATTORNEYS.

Aug. 9, 1938. P. H. WESTERLUND 2,126,072
ENSILAGE HARVESTER
Filed April 23, 1936 2 Sheets-Sheet 2

INVENTOR
Paul H. Westerlund,
BY Brown, Jackson, Boettcher & Dienner.
ATTORNEYS.

Patented Aug. 9, 1938

2,126,072

UNITED STATES PATENT OFFICE 2,126,072

ENSILAGE HARVESTER

Paul H. Westerlund, Moline, Ill., assignor to Deere & Company, Moline, Ill., a corporation of Illinois Application April 23, 1936, Serial No. 76,022

10 Claims. (Cl. 146—118)

This invention relates to improvements in harvesting machinery of the class commonly known as ensilage harvesters which are designed to harvest and cut up corn stalks and the like.

An ensilage harvester of this general type is fully illustrated and described in Patent No. 1,702,551, to William B. Thiemann, and the present invention contemplates certain improvements in the construction shown in that patent. As shown in the above mentioned patent, the ensilage harvester thereof comprises a suitable harvesting mechanism which gathers the standing or leaning stalks of corn and carries them to a feed conveyor supported within a feeder house which, in turn, carries the stalks past a beater positioned above the conveyor and delivers them between a pair of feeding rollers. The feeding rollers in turn feed the stalks to the cutting mechanism where it is cut into small pieces, called ensilage, and then delivered to the wagon elevator of the harvester. These feeding rollers are disposed one above the other in substantial parallel relationship and are arranged transversely between the side walls of the feeder house, and the lower feeding roller is journaled in bearings secured in a fixed position either to the frame of the implement or to the side walls of the feeder house.

In the arrangement illustrated and described in the above mentioned patent, the outwardly extending ends or trunnions of the upper feed roller extend through arcuate slots in the opposite side walls of the feeder house and are journaled in bearings which are fixedly secured to the lower ends of supporting arms one of which is disposed at each side of the feeder house on the outer side of the side wall thereof. The upper ends of the arms are pivotally supported on the ends of the transverse beater shaft, which is journaled in the feeder house above the upper feeding roller. This arrangement permits the upper feeding roller to rise and fall away from or toward the lower feeding roller in substantial parallel relationship to the lower feeding roller, and this substantial parallel relationship between the two rollers is always maintained owing to the fact that the bearings for the upper feeding roller are fixedly secured in the supporting arms, and such arms therefore always swing together about their pivots when the rollers are forced apart by the material fed therebetween.

It frequently happens in the operation of the machine that material is delivered to the feed conveyor so that it is piled higher on one side of the feed conveyor than it is on the other side thereof, and with such a construction as above described the upper feed roller will engage only the top of the material which is piled high at one side of the conveyor and will remain out of engagement with the material which is piled lower on the opposite side of the conveyor. This necessarily will result in improper feeding of the lower piled material which is out of engagement with the upper feeding roller, since it permits this low piled material to lag behind or be drawn in too rapidly. This, of course, is objectionable, as will be readily appreciated.

With the above in view it is the principal object of the present invention to provide improved means for supporting the upper feeding roller in such a manner that either end of the roller may freely move up or down relatively to the opposite end of the roller, thus permitting the roller to automatically accommodate itself to engage with substantial equal pressure all of the material which is fed into the feeder house by the feeding conveyor, regardless of whether or not the material is evenly distributed at the same height across the surface of the feeding conveyor.

It is another object of the present invention to provide sliding cover members or plates for closing the arcuate slots in the side walls of the feeder house through which the outer ends of the upper feeding roller project, such cover members being suitably connected with the bearings on the outer ends of the feeding roller whereby such cover members will move up and down with such bearings to keep the slots in the side walls of the feeder house completely covered at all times to prevent the escape of the material or lodgment of the material in such slots, whereby none of the material can escape from the feeder house or tend to clog up the machine.

A further object of the present invention is to provide spring bumper means at the upper and lower ends of each slot and so positioned as to resiliently engage the feeding roller bearings when the roller is suddenly moved to either the upper or lower extremity of the slot, to thereby relieve the roller and its bearings of shock incident to such sudden movement.

It is a still further object of the present invention to provide means for adjusting the tension of the driving chain which drives the upper feeding roller.

These and other objects and advantageous features of the present invention will appear from the following description of the preferred embodiment thereof as illustrated in the accompanying drawings, in which:

Figure 1 is a fragmentary rear elevational view of a portion of an ensilage harvester to which my present improvements have been applied, certain of the parts enclosed within the feeder house being shown in dotted lines;

Figure 2:
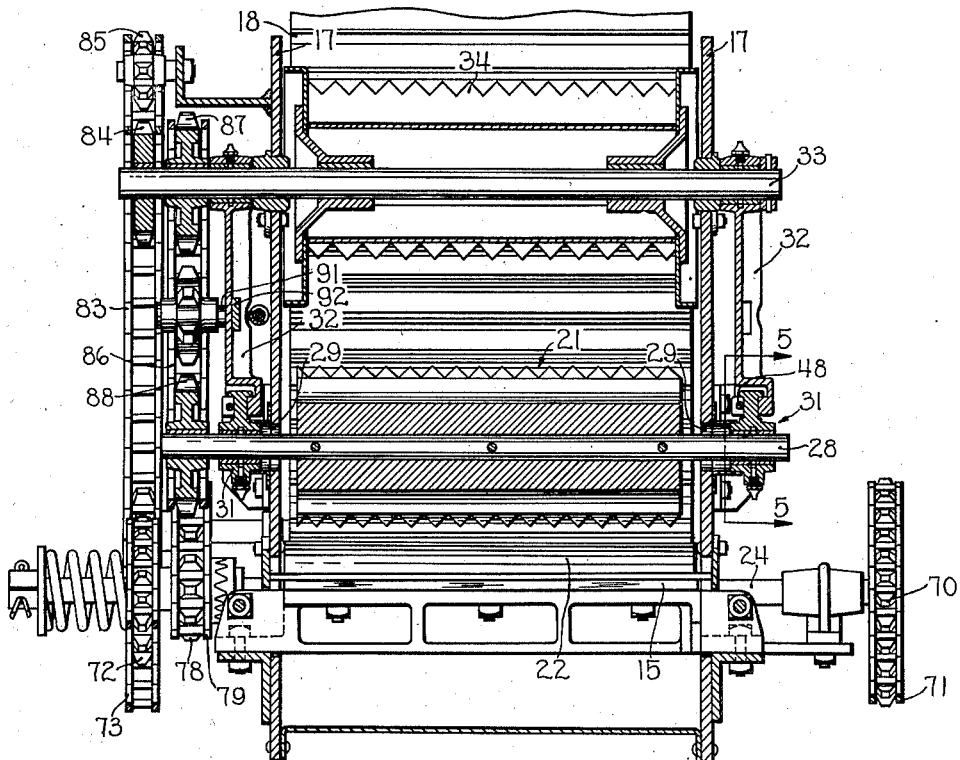
Figure 2 is a transverse sectional view taken substantially on the plane of the line 2—2 of Figure 1, and showing the upper and lower feeding rollers within the housing when in parallel relation to each other.
Figure 5:
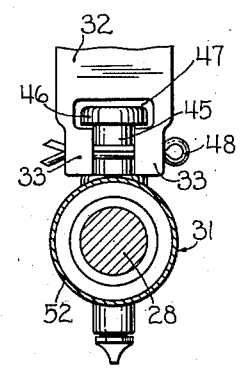

Figure 4 is a transverse sectional view taken substantially on the plane of the line 4—4 of Figure 1 and illustrating the mechanism for adjusting the tension of the driving chain for the upper feeding roller; and Figure 5 is a longitudinal sectional view, on an enlarged scale, taken substantially on the plane of the line 5—5 of Figure 2 and showing the means for swivelly attaching the bearings of the upper feeding roller shaft to the lower ends of the arms which support said roller.

As the present invention relates primarily to the means for supporting the upper feeding roller which feeds the stalks to the cutting mechanism of an ensilage harvester, only such parts of the harvester as are necessary to an understanding of the present invention have been illustrated in the accompanying drawings and will be hereinafter described. For a full showing and description of the various other parts of the harvester reference may be had, if desired, to the copending application of Ellsworth T. Johnson, Serial No. 76,035, filed April 23, 1936.

Referring to the drawings, the feed hopper or housing which is supported transversely on the frame of the implement in any suitable manner at the rear thereof is indicated by the reference numeral 11. Suitably supported within this housing is an endless feed conveyor 12 which at its upper end receives the material from the gathering mechanism and serves to feed such material downwardly to the cutter head of the ensilage cutter 14 which is disposed transversely of the housing and is shown in dotted lines in Figure 1. This ensilage cutter 14 comprises a rotary cutter which cooperates with a stationary knife 15 to reduce the material to ensilage, after which the material is delivered to an elevator 15a by which such material is delivered to a wagon or other desired place. The parts so far described are conventional in machines of this type and as the present invention is not particularly concerned with such parts it is believed that the foregoing brief description will suffice.

The feed conveyor 12 comprises a pair of endless chains disposed in spaced parallel relation and trained over upper and lower sprockets (not shown), the lower sprockets being secured to a transverse shaft 16 suitably journaled in bearings fixedly secured in the side walls 17 of the hopper. A plurality of transverse conveyor slats 18, preferably of angle iron, are secured to the endless chains, as shown in Figure 1. The upper run of the feed conveyor 12 is supported for vertical yielding movement adjacent the lower end thereof, as indicated at 19, but as this construction forms the subject matter of the above mentioned copending application of Ellsworth T. Johnson, to which reference may be had, description thereof in detail herein is not deemed necessary.

Figure 3:
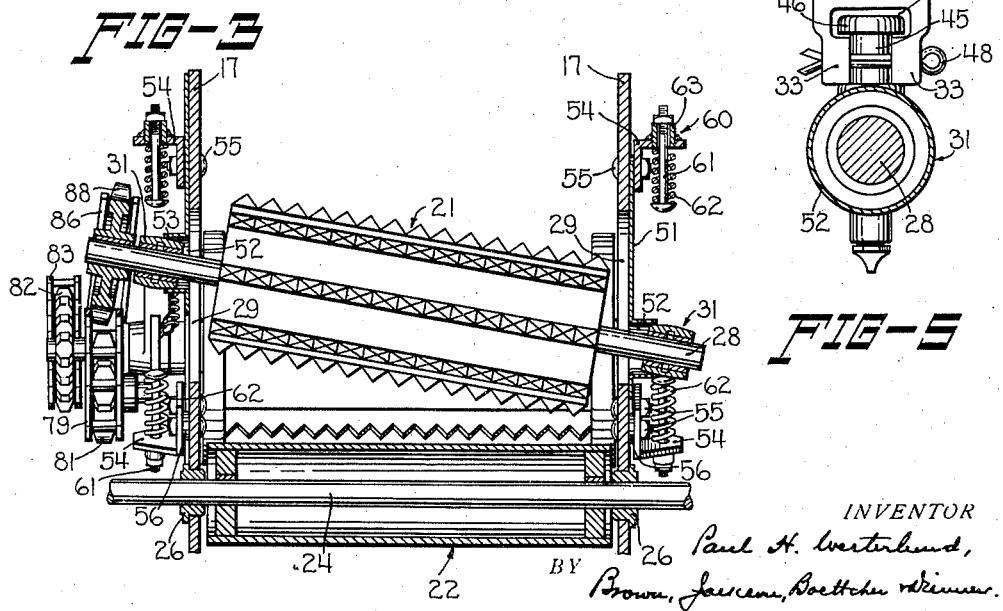
Figure 3 is a transverse sectional view taken substantially on the plane of the line 3—3 of Figure 1, showing the upper feeding roller in tilted or nonparallel relation to the lower feeding roller, and showing also the cover members for the arcuate slots in the side walls of the feeder house and the spring bumper means at the upper and lower ends of such slots.

Disposed transversely within the feeder house adjacent the lower end of the feed conveyor 12 are upper and lower feed rollers 21 and 22, respectively, between which the material delivered by the feed conveyor 12 passes and by which such material is fed to the cutting mechanism 14. The lower feeding roller 22 is fixedly secured in any suitable manner to a transverse shaft 24 having it sends journaled in stationary bearings 26 supported in the side walls 17 of the feeder house, as clearly shown in Figure 3. The upper feed roller 21 is fixedly secured in any suitable manner to a transversely extending shaft 28 which is floatingly supported for vertical swinging movement within the limits of arcuate slots 29 formed in the opposite side walls 17 of the feeder house, as best shown in Figure 3. The opposite ends of the shaft 28 project through such arcuate slots beyond the opposite side walls 17 of the feeder house and are journaled in bearings 31. Each of the bearings 31 has swivel mounting, as best shown in Figure 5, in the lower end of an arm 32 having its upper end journaled on a shaft 33 whereby said arms 32 have swinging movement on said shaft. The shaft 33 extends transversely through the feeder house, and a beater 34 is supported on the shaft within the feeder house and aids the endless feed conveyor 12 in feeding the material to the feed rollers 21 and 22.

The arcuate slots 29 through which the opposite ends of the upper feed roller shaft 28 extend are concentric with the axis of the shaft 33 on which the arms 32 are pivotally mounted, as shown in Figure 2. As shown in Figure 1, each of the arms 32 is normally urged downwardly to yieldingly hold the feed roller 21 in its lowermost position by means of a spring 40 having its lower end connected in any suitable manner with the arm 32 and its upper end secured to a suitable frame fastening as shown at 41.

As best shown in Figure 5, each of the bearings 31 for the upper feed roller shaft 28 has a trunnion 45 formed on one side and provided with an integral head portion 46 which is adapted to seat in a socket or recess 47 formed in the lower end of the arm 32. This socket 47 is open at one side as shown to permit the trunnion 45 to be inserted therein, and a cotter pin 48 passed through aligned holes in the side portions 33 of the arm 32 at opposite sides of the socket holds the trunnion in said recess. By this arrangement the bearing members 31 may turn relative to their arms 32 and as a result one end of the roller can rise freely relatively to the other end thereof, as will be readily understood. By this construction also the bearing members 31 at the opposite ends of the upper feed roller shaft 28 are always maintained in axial alignment when either end of the feed roller is raised relatively to the other end, whereby the feed roller shaft may rotate freely in its bearings without any binding effect and thus provide for the proper feeding of the material to the rotary cutting mechanism 14. It will be seen therefore that by this construction all of the material may be compressed by the upper feed roller 21 whether the material is evenly distributed on the feed conveyor or is piled higher on one side thereof than it is on the other.

The arcuate slots 29 in the opposite side walls of the feeder house through which the ends of the upper feed roller shaft 28 projects as above mentioned, are each closed by a cover plate 51. As best shown in Figure 3, each cover plate is provided with an opening 52 through which the adjacent end of the shaft 28 extends, and the margin of this opening is flared outwardly to provide a bearing surface 53 by which the cover plate is supported on the bearing 31 so that the cover plate is raised and lowered with the bearing in its vertical movements during the operation of the machine. The cover plates are of such a length that they completely cover the slots in all the positions that may be assumed by the bearings 31. Each of the cover plates 51 is held against the outer surface of the side wall of the feeder house by means of a pair of angle iron brackets or guide members 54, one of which is suitably secured as by two bolts 55 to the side wall of the feeder house adjacent the upper end of the slot while the other guide member 54 is similarly secured to such side wall adjacent the lower end of the slot, as best shown in Figure 3. Spacers 56 inserted between the guide members and the wall of the housing hold the guides spaced the proper distance from the side of the housing and provides a guideway for the plate 51 between the two bolts 55.

In order to relieve the bearings 31 of the upper vertically movable feed roller 21 of shock incident to being suddenly moved to either the upper or lower extremities of the slots 29, a suitable bumper, indicated as a whole by the reference numeral 60, is provided at the upper and lower extremities of each of said slots, said bumpers being best shown in Figure 3. As these bumpers are alike in construction, except that the upper and lower bumper at each side are oppositely disposed with respect to each other, the description of one of such bumpers will suffice. Each bumper comprises a bolt 61 disposed in a perforation provided therefor in the horizontally extending leg of the bracket 54. The bolt 61 is in vertical alignment with the bearing member 31 and the head of the bolt is adapted to be engaged by the bearing member when it is moved vertically upon vertical movement of the roller 21. A compression spring 62 encircles the bolt 61 in position between the head of the bolt and the horizontal leg of the bracket 54. A bushing 63 is welded or otherwise suitably secured to the horizontal leg of the bracket 54 and the bolt extends through such bushing as clearly shown in Figure 3. This bushing 63 serves as a guide for the bolt as it is moved in and out through the bracket 54 by the bearing 31 and prevents side play of the bolt relative to the bracket, whereby the bolt is held in alignment with the bearing at all times.

The driving mechanism for driving the upper and lower feed rollers will now be described, and as such driving means is so interconnected with the means for driving other parts of the implement that are shown in the accompanying drawings, all of the driving mechanism that has been illustrated will be described herein. The complete driving mechanism for the various parts of a harvester of this type is fully shown and described in the copending application of Ellsworth T. Johnson above referred to, and, therefore, reference may be had to that application if desired.

As shown in Figure 2, the shaft 24 on which the lower feed roller is fixedly secured, as has been described above, has a sprocket 70 fastened on the forward end thereof, said sprocket being driven by a drive chain 71 which is operatively connected in any suitable manner, such as that shown and described in the above mentioned Ellsworth T. Johnson application, with a source of power. A sprocket 72 is fixed to the opposite or rear end of the shaft 24 and trained over this sprocket is a drive chain 73 which is also trained over a sprocket 74 fixed on the conveyor shaft 75 of the wagon elevator 15a, as shown in Figure 1, whereby the elevator conveyor is driven by the drive chain 73. A pair of idler rollers 77 suitably supported on the side wall of the feeder house serve to keep the chain 73 at the desired tension.

Also fixed on the shaft 24 and positioned on the inner side of the sprocket 72 is a sprocket 78 (see Figure 2) over which is trained a drive chain 79. The drive chain 79 extends over a sprocket 81 secured on the rear end of the shaft 16 by means of which the feed conveyor 12 is driven (see Figure 1). A second sprocket 82 is also mounted on the shaft 16 on the outer side of the sprocket 81 and a chain 83 is trained around the sprocket 82 and extends upwardly around one side of a sprocket 84 fixed on the rear end of the shaft 33 that supports the beater 34. As best shown in Figure 1, a pair of idler sprockets 85 suitably supported on the side wall 17 of the feeder house are disposed above the sprocket 84 and serve to hold the opposite runs of the chain 83 in the desired spaced relation. The upper feed roller 21 is driven from the beater shaft 33 by a drive chain 86 trained over a sprocket 87 (Figure 2) fast on the shaft 33 on the inner side of the sprocket 84 and over a sprocket 88 fixed to the rear end of the shat 28 of the upper feed roller 21.

A chain tightener which is indicated as an entirety by the reference numeral 89 and is best shown in Figure 4 is provided for adjusting the tension of the drive chain 86. This chain tightener 89 comprises a sprocket 90 which is journaled on a stud 91 adjustably mounted in the lower end of an arm or bracket 92, the upper end of which extends through an opening 93 provided therefor in the rear one of the two arms 32 that supports the upper feed roller. A guide rod 94 secured to the arm 92 extends outwardly from the arm and is bent upwardly in parallel relation to the arm 92 as shown and has its upper end projecting through a hole 95 provided in the supporting arm 32 adjacent to the opening 93 through which the bracket 92 extends as above described. The arm 92 is normally urged downwardly by a coiled compression spring 96 positioned around the upwardly bent portion of the guide rod 94 and positioned between the arm 32 and the angled portion 94a of the guide rod 94. By this construction the tension of the chain 86 may be varied by adjusting the sprocket 90 along the arm 92, and to facilitate this adjustment a slot 98 is provided in the lower end of the arm 92 to receive the adjacent end of the stud 91 on which the sprocket 90 is journaled as above described. In order to adjust the tension of the chain 86 it is only necessary to loosen the nut 99 on the threaded end of the stud 91 and move the stud in the slot 98 until the chain 86 is brought to the desired tension, and then the nut is again tightened to hold the stud 91 and the sprocket 90 supported thereby in adjusted position, as will be readily understood. This also accommodates wear in and lengthening of the chain 86.

I claim:—

1. A harvesting machine comprising, in combination, a housing, upper and lower feed rollers positioned in said housing normally in parallel relationship with each other for feeding the harvested material, a swinging arm at each side of said housing, a shaft supporting the upper feed roller, there being a recess formed in the lower end of each arm, a headed trunnion swively supported in each recess, and a bearing supported on each of said trunnions and receiving said shaft, whereby either end of said roller may swing vertically relatively to the opposite end thereof.

2. A harvesting machine comprising, in combination, a housing, upper and lower feed rollers positioned in said housing normally in parallel relationship with each other, a slot in each side wall of the housing, a shaft supporting said upper roller and having its outer ends extending through said slots, bearing means for supporting each end of said shaft whereby either end of said shaft may move vertically relatively to the opposite end thereof, and a cover plate for each of said slots, said cover plates being movable with said shaft in the vertical movement thereof and each having an opening through which the end of said shaft projects and an outwardly extending flange surrounding the asociated bearing and accommodating both angular and lateral movement of the latter therein.

3. A harvesting machine comprising, in combination, a housing, upper and lower feed rollers positioned in said housing normally in parallel relationship with each other, a slot in each side wall of the housing, a shaft supporting said upper roller and having its outer ends extending through said slots, bearing means for supporting the outer ends of said shaft whereby either end of said shaft may move vertically relatively to the opposite end thereof, a cover plate for each of said slots, said cover plates being movable with said shaft in the vertical movement thereof, and each having an opening through which the end of said shaft projects and an outwardly extending flange surrounding the associated bearing and accommodating both angular and lateral movements of the latter therein and guide means secured to each side wall of the housing to restrain said cover plates for movement in parallel planes.

4. A harvesting machine comprising, in combination, a housing, upper and lower feed rollers positioned in said housing normally in parallel relationship with each other, a slot in each side wall of the housing, a shaft supporting said upper roller and having its outer ends extending through said slots, bearing means for supporting the outer ends of said shaft whereby either end of said shaft may move vertically relatively to the opposite end thereof, a cover plate for each of said slots, said cover plates being movable with said shaft in the vertical movement thereof, and each having an opening through which the end of said shaft projects and an outwardly extending flange surrounding the associated bearing and accommodating both angular and lateral movement of the latter therein and guide means secured to each side wall of the housing to restrain said cover plates for movement in parallel planes, said guide means comprising plates secured to the side wall of the housing adjacent said slot and spacer members positioned between said plates and said side wall to provide for movement of said cover plate between said guide plates and the side wall of the housing.

5. A harvesting machine comprising, in combination, a housing, upper and lower feed rollers positioned in said housing normally in parallel relationship with each other, a slot in each side wall of the housing, a shaft supporting said upper roller and having its outer ends extending through said slots, means for supporting the outer ends of said shaft whereby either end of said shaft may move vertically relatively to the opposite end thereof, and a cover plate for each of said slots, said cover plates being movable with said shaft in the vertical movement thereof, guide plates secured to the side walls of the housing adjacent the upper and lower ends of said slots for guiding said cover plate, and cushioning means carried by said guide plates and adapted to be contacted by the outer ends of said shaft for limiting the upper and lower movements thereof.

6. A harvesting machine comprising, in combination, a housing, upper and lower feed rollers positioned in said housing normally in parallel relationship with each other, a slot in each side wall of the housing, a shaft supporting said upper roller and having its outer ends extending through said slots, means for supporting the outer ends of said shaft whereby either end of said shaft may move vertically relatively to the opposite end thereof, and a cover plate for each of said slots, said cover plates being movable with said shaft in the vertical movement thereof, angle iron brackets secured to the side walls of the housing adjacent the upper and lower ends of said slots, the vertical flanges of said brackets forming guides for said cover plates, and cushioning members carried by the horizontal flanges of said brackets for limiting the upper and lower movements of said shaft.

7. A harvesting machine comprising, in combination, a housing, upper and lower feed rollers in said housing, a pair of arms at opposite sides of said housing pivotally supported at their upper ends for swinging movement and supporting the upper feed roller at their lower ends whereby said upper feed roller may move vertically relatively to the lower feed roller, a driving sprocket on said upper feed roller, a driving chain trained around said sprocket for driving said roller, and means carried by one of said arms for maintaining constant the tension of said driving chain, said means comprising a bracket slidably supported by said arm, an idler sprocket carried by said bracket and contacted by said chain, a guide rod secured to said bracket and extending through an opening in said arm, and a compression spring surrounding said guide rod acting against the arm and reacting against the bracket.

8. A harvesting machine comprising, in combination, a housing, upper and lower feed rollers in said housing, a pair of arms at opposite sides of said housing pivotally supported at their upper ends for swinging movement and supporting the upper feed roller at their lower ends, whereby said upper feed roller may move vertically relatively to the lower feed roller, a driving sprocket on said upper feed roller, a driving chain trained around said sprocket for driving said roller, a bracket slidably supported by one of said arms, an idler sprocket carried by said bracket and contacted by said chain, means acting against the arm and reacting against the bracket for maintaining the tension of the chain, and means for adjusting the idler sprocket longitudinally of said bracket to thereby adjust the tension of said chain, and means for fixedly securing said idler sprocket in any adjusted position.

9. An agricultural machine comprising, in combination, a housing, a feed roller positioned in said housing for feeding the harvested material, a swinging arm at each side of said housing and having a recess at the free end thereof, a shaft supporting said roller, and trunnions supporting the opposite ends of said shaft in said arms and comprising members slidably carrying said shaft and having shank sections journaled in the recesses of said arms for rocking movement about axes disposed longitudinally of said arms and at right angles to the axis of said shaft, whereby either end of said roller may swing vertically relatively to the opposite end thereof.

10. A harvesting machine comprising, in combination, a housing, a feed roller positioned in said housing, a slot in each side wall of the housing, a shaft supporting said roller and having its outer ends extending through said slots, means for supporting said shaft for both vertical and tilting movement in said slots, a cover plate on each side wall constrained to move parallel with respect thereto over said slots, and means connecting the ends of said shaft to said cover plates for axial sliding movement relative to the latter whereby either end of said roller may swing vertically relatively to the opposite end thereof.

PAUL H. WESTERLUND.